United States Patent
Mohalik et al.

(10) Patent No.: US 11,722,383 B2
(45) Date of Patent: Aug. 8, 2023

(54) METHOD FOR MITIGATING DISRUPTION DURING MAINTENANCE OF AN EDGE GATEWAY NODE

(71) Applicant: Telefonaktiebolaget LM Ericsson (publ), Stockholm (SE)

(72) Inventors: Swarup Kumar Mohalik, Bangalore (IN); Sambit Nayak, Bhubaneswar (IN); Chakri Padala, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 14 days.

(21) Appl. No.: 17/430,843

(22) PCT Filed: Feb. 22, 2019

(86) PCT No.: PCT/SE2019/050160
§ 371 (c)(1),
(2) Date: Aug. 13, 2021

(87) PCT Pub. No.: WO2020/171747
PCT Pub. Date: Aug. 27, 2020

(65) Prior Publication Data
US 2022/0166687 A1  May 26, 2022

(51) Int. Cl.
*H04L 41/5025* (2022.01)
*G06F 9/48* (2006.01)
(Continued)

(52) U.S. Cl.
CPC ........ *H04L 41/5025* (2013.01); *G06F 9/4856* (2013.01); *G06N 5/02* (2013.01); *H04L 41/082* (2013.01); *H04L 41/16* (2013.01)

(58) Field of Classification Search
CPC ... H04L 41/5025; H04L 41/082; H04L 41/16; G06F 9/4856; G06N 5/02
See application file for complete search history.

(56) References Cited

U.S. PATENT DOCUMENTS 10,853,111 B1 * 12/2020 Gupta ................. G06F 9/45558
10,938,660 B1 *  3/2021 Kapur ................. H04L 41/0266
(Continued)

FOREIGN PATENT DOCUMENTS

CN      102624929 A      8/2012
WO   2015183865 A1   12/2015
(Continued)

OTHER PUBLICATIONS

International Search Report and Written Opinion of the International Searching Authority for PCT International Application No. PCT/SE2019/050160 dated Nov. 1, 2019.
(Continued)

*Primary Examiner* — Patrice L Winder
*Assistant Examiner* — Angela M Widhalm De Rodriguez
(74) *Attorney, Agent, or Firm* — Sage Patent Group

(57) ABSTRACT

A method in a network node is provided for mitigating disruption during maintenance of an edge gateway node of a communication network. The edge gateway node connects devices to services(s) of the communication network. First device(s) are capable of connecting to a cloud environment in the absence of the edge gateway node, and second device(s) are incapable of connecting to the cloud environment in the absence of the edge gateway node. The method comprises: establishing respective virtual devices for the second device(s), the virtual devices comprising predictive models trained to replicate data output by the respective second device(s); and, during a time interval in which the maintenance of the edge gateway node is performed: configuring the virtual device(s) to connect to a virtual edge gateway node established in the cloud environment; and configuring at least one of the first device(s) to connect to the virtual edge gateway node.

20 Claims, 5 Drawing Sheets

(51) Int. Cl.
    *G06N 5/02*       (2023.01)
    *H04L 41/082*     (2022.01)
    *H04L 41/16*      (2022.01)

(56)         References Cited

U.S. PATENT DOCUMENTS

2009/0076873 A1*  3/2009  Johnson ................. G06Q 10/06
                                                       705/7.28
2016/0274552 A1*  9/2016  Strohmenger ......... G05B 11/01
2017/0064042 A1*  3/2017  Vora .................... H04L 41/0895
2020/0213878 A1*  7/2020  Yang ....................... H04W 4/70

FOREIGN PATENT DOCUMENTS

WO          2018009205 A1   1/2018
WO          2018049552 A1   3/2018
WO          2019033475 A1   2/2019

OTHER PUBLICATIONS

Verba Nandor et al., "Platform as a service gateway for the Fog of Things", Advanced Engineering Informatics, vol. 33, Aug. 1, 2017, 15 pages.
Zhang T et al, "A Methodology for Maintenance-Interval Scheduling of Equipment Considering Maintenance Effect", Clean Electrical Power, May 1, 2007, 8 pages.
Extended European Search Report, EP 19916064.9, dated Jan. 27, 2022, 9 pages.

* cited by examiner

METHOD FOR MITIGATING DISRUPTION DURING MAINTENANCE OF AN EDGE GATEWAY NODE

CROSS REFERENCE TO RELATED APPLICATION

This application is a 35 U.S.C. § 371 national stage application of PCT International Application No. PCT/SE2019/050160 filed on Feb. 22, 2019, the disclosure and content of which is incorporated by reference herein in its entirety.

TECHNICAL FIELD

Embodiments of the disclosure provide methods, apparatus and machine-readable mediums relating to maintenance of nodes in a communication network, and particularly to mitigating disruption during maintenance of an edge gateway node of the communication network.

BACKGROUND

Internet of Things (IoT) systems are expected to become ubiquitous in the coming years. IoT systems typically involve the connection of a large number of devices to an internet platform or application. The devices so connected may comprise traditionally non-internet-enabled physical devices or objects. IoT systems are expected to involve large numbers of sensors for monitoring and reporting a wide range of parameters (e.g., weather, traffic, medical monitors, etc). These and other systems are expected to involve large numbers of actuators (e.g., in manufacturing plants, operating theatres, etc), which receive and act upon control signals from the IoT application.

Edge gateways play a critical role in such systems as they provide the primary communication mechanism for connecting the majority of IoT devices (e.g., sensors, actuators, etc) to IoT platforms or applications. Edge gateways may provide a variety of functionalities, dependent on their capability, from simple forwarding of sensor data to cloud systems, to complex middleware providing interoperability between protocol and data, to higher level filter and aggregation functions.

As with any electronic device, however, edge gateways may degrade or develop faults, and therefore require maintenance and/or replacement. For example, hardware may require replacement or an upgrade; software such as firmware may need to be updated. All such work is described hereinafter as "maintenance".

When the edge gateway is undergoing maintenance, therefore, there is a need to provide gateway functionality via an alternative mechanism.

SUMMARY

Embodiments of the disclosure seek to address these and other problems.

One method of solving the problem is to provide redundant hardware which is synchronized with the edge gateway prior to its maintenance. During the maintenance, IoT devices are connected to the redundant or back-up edge gateway, which also takes over any tasks performed by the original edge gateway. While this approach mitigates disruption caused by the maintenance to the original edge gateway, it requires network operators to provide a back-up node for each node which might require maintenance and is likely to be prohibitively expensive.

In one aspect, there is provided a method in a network node for mitigating disruption during maintenance of an edge gateway node of a communication network. The edge gateway node connects a plurality of devices to one or more services of the communication network. The plurality of devices comprise one or more first devices which are capable of connecting to a cloud environment of the communication network in the absence of the edge gateway node, and one or more second devices which are incapable of connecting to the cloud environment in the absence of the edge gateway node. The method comprises: establishing respective virtual devices for the one or more second devices, the virtual devices comprising predictive models trained to replicate data output by the respective one or more second devices; and, during a time interval in which the maintenance of the edge gateway node is performed: configuring the one or more virtual devices to connect to a virtual edge gateway node established in the cloud environment; and configuring at least one of the one or more first devices to connect to the virtual edge gateway node.

Apparatus for performing the method outlined above is also provided. Thus, in one aspect the disclosure provides a network node which is configured to perform the method set out above, and also described in more detail below. In another aspect, there is provided a network node for mitigating disruption during maintenance of an edge gateway node of a communication network. The edge gateway node connects a plurality of devices to one or more services of the communication network. The plurality of devices comprises one or more first devices which are capable of connecting to a cloud environment of the communication network in the absence of the edge gateway node, and one or more second devices which are incapable of connecting to the cloud environment in the absence of the edge gateway node. The network node comprises processing circuitry and a non-transitory machine-readable medium storing instructions which, when executed by the processing circuitry, cause the network node to: establish respective virtual devices for the one or more second devices, the virtual devices comprising predictive models trained to replicate data output by the respective one or more second devices; and, during a time interval in which the maintenance of the edge gateway node is performed: configure the one or more virtual devices to connect to a virtual edge gateway node established in the cloud environment; and configure at least one of the one or more first devices to connect to the virtual edge gateway node.

A further aspect provides a non-transitory machine-readable medium storing instructions for execution by processing circuitry of a network node for mitigating disruption during maintenance of an edge gateway node of a communication network. The edge gateway node connects a plurality of devices to one or more services of the communication network. The plurality of devices comprises one or more first devices which are capable of connecting to a cloud environment of the communication network in the absence of the edge gateway node, and one or more second devices which are incapable of connecting to the cloud environment in the absence of the edge gateway node. Execution of the instructions causes the network node to: establish respective virtual devices for the one or more second devices, the virtual devices comprising predictive models trained to replicate data output by the respective one or more second devices; and, during a time interval in which the maintenance of the edge gateway node is performed: configure the one or more virtual devices to connect to a virtual edge gateway node established in the cloud environment; and configure at least one of the one or more first devices to connect to the virtual edge gateway node.

BRIEF DESCRIPTION OF THE DRAWINGS

For a better understanding of embodiments of the present disclosure, and to show more clearly how they may be carried into effect, reference will now be made, by way of example only, to the following drawings, in which.

DETAILED DESCRIPTION

Figure 1:
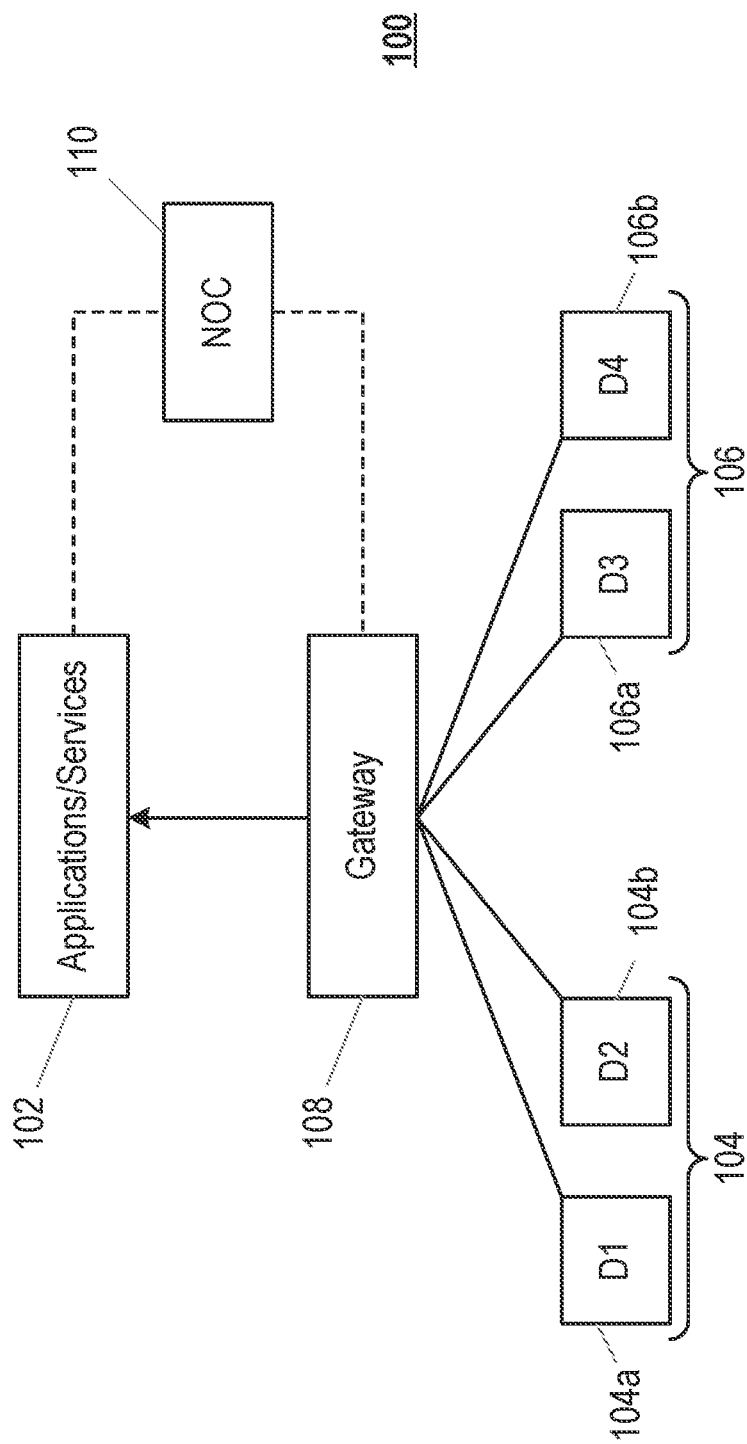
FIG. 1 is a schematic diagram of a communication network according to embodiments of the disclosure.

FIG. 1 is a schematic diagram of a communication network 100 according to embodiments of the disclosure. The communication network 100 comprises one or more applications and/or services 102, a plurality of first devices 104, a plurality of second devices 106, an edge gateway node 108 and a network operations centre (NOC) 110.

The applications and/or services 102 comprise one or more applications or services which utilize data provided by the first and second devices 104, 106, to provide a service to one or more users or subscribers (not illustrated) of the network 100. As noted above, IoT systems are expected to be used in a wide range of use cases, and thus the nature of the applications 102 depends on the nature of the first and second devices 104, 106. For example, one application may provide a service monitoring vehicular traffic levels in a municipal area such as a city. In this case, the first and second devices 104, 106 may comprise one or more sensors for monitoring vehicle traffic such as cameras, pressure sensors embedded in roads, air quality sensors, etc. An alternative application 102 may relate to weather reporting or forecasting. In this case, the first and second devices 104, 106 may comprise one or more sensors for monitoring temperature, air pressure, precipitation, wind speed, wind direction, etc. In some embodiments therefore, the first and second devices 104, 106 comprise sensors configured to provide sensor data. However, the present disclosure is not limited thereto.

The applications and/or services 102 will typically be implemented in a computing environment, such as one or more computer servers.

As shown in FIG. 1, the first and second devices 104, 106 are coupled to the applications and/or services 102 via the edge gateway node 108. The edge gateway node 108 may be located at the intersection of a local network that connects the first and second devices 104, 106, and the Internet. Thus the edge gateway node 108 provides a mechanism for the first and second devices 104, 106 to access the Internet and the applications and/or services 102 (or alternatively, for the applications and/or services 102 to access the first and second devices 104, 106).

As noted above, in addition to providing a communication link between the devices 104, 106 and the internet, the edge gateway node 108 may perform one or more further tasks. Such further tasks may include one or more of the following: providing interoperability between data transmitted using different protocols; filtering functions (e.g., to filter out duplicated data); and aggregation functions (e.g., to aggregate data from multiple devices 104, 106 into single packets for onward transmission to the applications and/or services 102).

The communication links between the first and second devices 104, 106 and the edge gateway node 108 may be wired or wireless. In the former case, the communication links may utilize protocols such as Ethernet, for example. In the latter case, the communication links may utilize communication protocols such as IEEE 802.11 (WiFi), 3GPP protocols such as Wideband Code-Division Multiple Access (WCDMA), Long Term Evolution (LTE) and New Radio (NR), Bluetooth®, ZigBee, Narrow-Band Internet of Things (NB-IoT), etc.

It will be noted that the first and second devices 104, 106 may each utilize different protocols for communicating with the edge gateway node 108. For example, device D1 (labelled 104a) may utilize a wired connection, while device D2 (labelled 104b) may utilize a wireless connection. Similarly, device D3 (labelled 106a) may utilize a first wireless protocol for its connection to the edge gateway node 108, while device D4 (labelled 106b) may utilize a second, different wireless protocol for its connection to the edge gateway node 108. In general, the first and second devices 104, 106 may utilize any protocol or modality for communicating with the edge gateway node 108 (subject to the qualification below). The first devices 104 may utilize the same or different protocols or modalities as each other; the second devices 106 may similarly utilize the same or different protocols or modalities as each other.

The plurality of first devices 104 and the plurality of second devices 106 differ from each other in their ability to access the applications and/or services 102 (e.g., the Internet) in the absence of the edge gateway node 108. The first devices 104 are capable of accessing the applications and/or services 102 in the absence of the edge gateway node 108. The second devices 106 are incapable of accessing the applications and/or services 102 in the absence of the edge gateway node 108. Those skilled in the art will appreciate that this situation may alternatively be described as the applications and/or services 102 reaching the first and second devices 104, 106. Thus disclosures herein of the first and/or second devices 104, 106 reaching the applications and/or services 102 (or being capable of doing so) are to be read as also covering the applications and/or services 102 reaching the first and/or second devices 104, 106.

For example, the first devices 104 may have the capability of utilizing a cellular radio access technology (such as a 3GPP protocol) which enables them to access the applications and/or services 102 via a connection with an alternative radio access network node (e.g., a base station) in the absence of the edge gateway node. The second devices 106 may not have that capability, and so be unable to connect to the Internet in the absence of the edge gateway node.

In an alternative embodiment, the first devices 104 may have the capability of establishing a wireless communication link with another radio access node (via any radio access technology), whereas the second devices 106 may not be capable of implementing wireless communication.

However, as noted above there are many different scenarios in which devices may be capable or incapable of reaching the applications and/or services 102 in the absence of the edge gateway node 108. For example, as noted above, in one embodiment the edge gateway node 108 may implement the functionality of an IoT Gateway. The functionality of an Internet Protocol (IP) Gateway may be additionally implemented in the edge gateway node 108 or not. If the IOT gateway and IP gateway functionalities are implemented in different devices, it may be possible for certain devices without radio access capabilities to reach the cloud environment 212 in the absence of the edge gateway node 108. Thus, in such a scenario these devices would be considered as first devices 104 despite their inability to use radio access. On the other hand, some radio access protocols such as ZigBee or 6LowPan require protocol conversion by an IoT Gateway. Devices which implement only these radio access protocols are unable to access the applications and/or services 102 in the absence of the edge gateway node 108, and would thus be considered as second devices 106 herein.

As noted above, the network 100 further comprises a NOC 110, which is communicatively coupled to the applications and/or services 102 and the edge gateway node 108. The NOC 110 (which may also be known as a network management centre) is one or more locations from which network monitoring and control, or more generally network management, is exercised over the network 100. For example, the performance of network nodes and functions may be monitored from the NOC 110, and then maintenance tasks for those network nodes and functions scheduled as required.

In the context of the present disclosure, the NOC 110 may comprise a network node which monitors the performance of the edge gateway node 108 and schedules maintenance to be performed on the edge gateway node 108 as required. The network node in the NOC 110 may further perform a method as described below to mitigate disruption caused by that maintenance. In alternative embodiments, the network node may be implemented in different locations within the network 100. For example, the network node may be implemented within or coupled to a core network of the network 100 (not illustrated).

The communication network 100 thus faces a problem when it is determined that the edge gateway node 108 requires maintenance. During the period of maintenance (i.e., while the edge gateway node 108 is unavailable or absent), the first and second devices 104, 106 are unable to connect to the applications and/or services 102.

According to embodiments of the present disclosure, a virtual edge gateway node is established in a cloud environment of the network, which replicates the functionality of the edge gateway node undergoing maintenance. Devices which are capable of connecting to the cloud environment in the absence of the edge gateway node (e.g., first devices 104 described above) are configured to connect to the virtual edge gateway node instead of the edge gateway node undergoing maintenance. Devices which are incapable of connecting to the cloud environment in the absence of the edge gateway node (e.g., second devices 106 described above) are replaced with respective virtual devices (or "digital twins") which are trained to replicate data output by the devices they are replacing. For example, the virtual devices may be trained using a machine-learning algorithm and training data comprising the actual data output by the respective devices.

Figure 2:
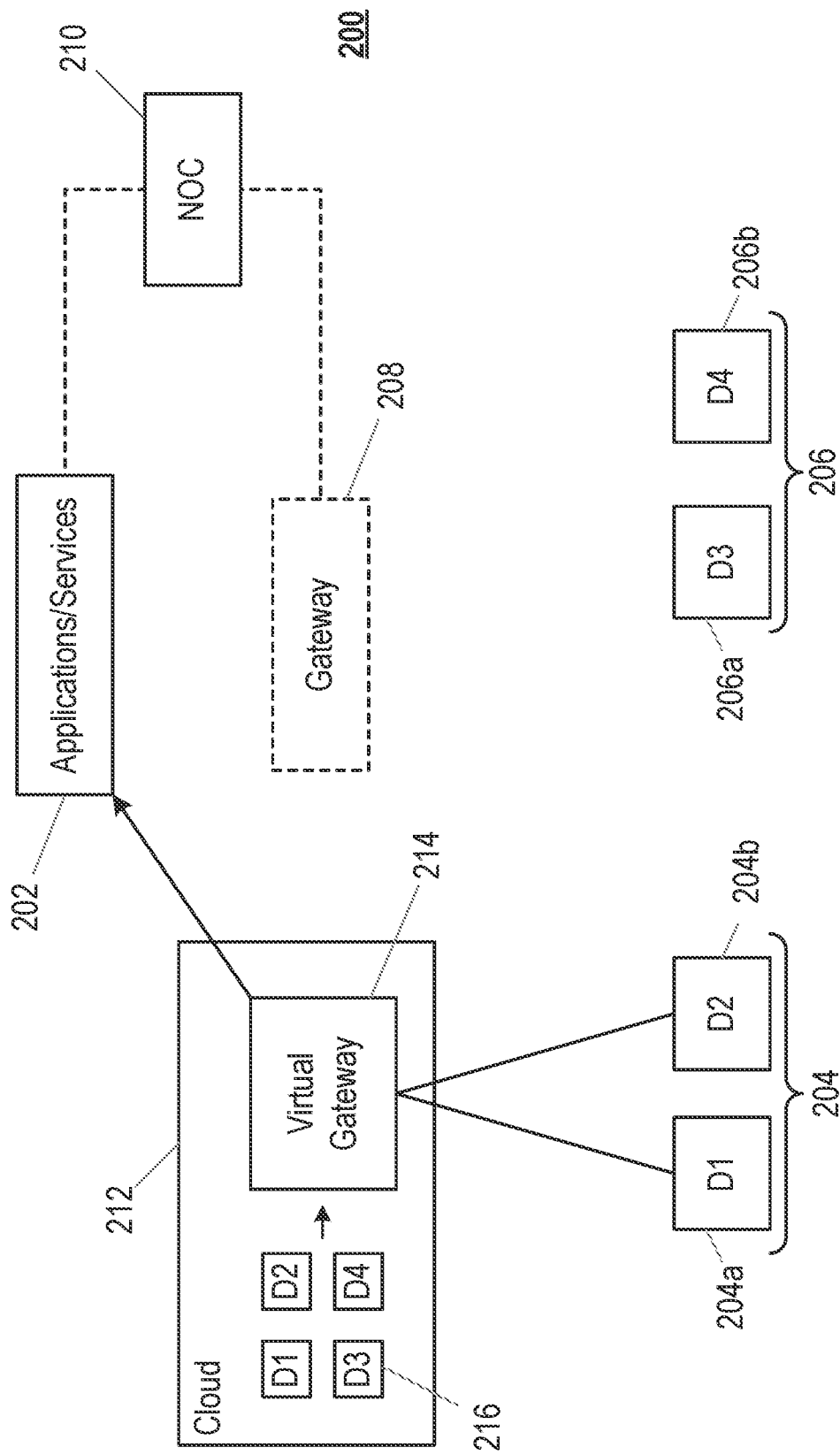
FIG. 2 is a schematic diagram of a communication network according to embodiments of the disclosure during maintenance of a node.

FIG. 2 is a schematic diagram of a communication network 200 according to embodiments of the disclosure during maintenance of an edge gateway node. The network 200 may thus correspond substantially to the network 100 described above with respect to FIG. 1, and thus nodes with corresponding reference numerals are not described in further detail herein. For example, applications and/or services 202, one or more first devices 204, one or more second devices 206, edge gateway node 208 and NOC 210 may correspond substantially to applications and/or services 102, one or more first devices 104, one or more second devices 106, edge gateway node 108 and NOC 110 respectively. It will be seen that the edge gateway node 208 is shown in dashed lines, indicating its absence or unavailability for communication with the first and second devices 204, 206.

The network 200 additionally comprises a cloud environment 212. For example, the cloud environment 212 may be implemented by one or more computer servers or devices.

A virtual edge gateway node 214 is implemented in the cloud environment 214. Those skilled in the art will understand that the term "virtual" in this conveys that a node is emulated partly or wholly in software so as to appear as if it physically exists. In this context, therefore, the virtual edge gateway node 214 is an emulation of the edge gateway node 208.

Virtual devices 216 are additionally implemented in the cloud environment 212. Virtual devices 216 are software copies of at least second devices 206 (e.g., devices D3 and D4, 206*a*, 206*b*) that are capable of replicating the data which is likely to be produced by the second devices 206 during a gateway upgrade. In the illustrated embodiment, the virtual devices 216 additionally include software copies of the first devices 204 (e.g., devices D1 and D2, 204*a*, 204*b*).

Note that the virtual devices 216 are illustrated in the same cloud computing environment 212 as the virtual edge gateway node 214. While this may be convenient, embodiments of the present disclosure are not so limited; the virtual devices 216 and the virtual edge gateway node 214 may be provided in multiple cloud computing environments.

The virtual devices 216 may comprise a predictive model which is trained to replicate data output by the respective device 204, 206. Such a predictive model may be trained based on real data output by the respective device 204, 206 using a machine-learning algorithm. Thus each virtual device 216 may be trained based on the real data output by a respective device 204, 206. The virtual device 216 may be configured to obtain or be provided with such data during normal operation. The predictive model for each virtual device 216 may be trained using a machine-learning algorithm such as autoregressive integrated moving average (ARIMA), decision trees or neural networks, for example. The predictive model predicts one or more future data values based on a time series of data points.

While the edge gateway node 208 is undergoing maintenance, the output of the second devices 206 (which are unable to connect to the applications and/or services 202 in the absence of the edge gateway node 208) is replicated by their respective virtual devices 216. Thus the respective virtual devices 216 are activated and connected to the virtual edge gateway node 214.

As the first devices 204 are capable of connecting to the cloud environment 212 in the absence of the edge gateway node 208 (e.g., through an alternative connection mechanism), these devices may be reconfigured to connect to the virtual edge gateway node 214 instead of the edge gateway node 208. In certain embodiments, however, it may be found beneficial or at least acceptable for one or more of the first devices 204 to also be replaced by respective virtual devices 216. In this case, virtual devices for those one or more first devices 204 may be activated and connected to the virtual edge gateway node 214; the corresponding first devices 204 are not reconfigured to connect to the virtual edge gateway node 214.

The data provided by the virtual devices 216 will inevitably have a lower quality than data provided by the physical devices 204, 206. However, this may be acceptable for the short period of time in which the edge gateway node 208 undergoes maintenance. Indeed, the virtual devices 216 will provide a higher data quality than the absence of data which would otherwise occur without the virtual devices 216 during maintenance of the edge gateway node 208.

In one embodiment, a service level agreement (SLA) may be agreed between an operator of the network 200 and a provider of the applications and/or services 202, defining one or more performance metrics that the network 200 should meet (e.g., data quality, mean time between failures, throughput, mean time to recovery, data rates, etc). The requirements of the SLA may be met better by the provision of virtual devices 216 and replicated data, than by the absence of virtual devices 216 and any data. This aspect is discussed in further detail below with respect to FIG. 4.

Thus the virtual edge gateway node 214 receives data from both physical and virtual devices. This data is then forwarded on to the applications and/or services 202 in a substantially similar manner to that described above with respect to FIG. 1.

As noted above, in addition to data forwarding, the edge gateway node 208 may perform one or more further tasks such as one or more of: providing interoperability between data transmitted using different protocols; filtering functions (e.g., to filter out duplicated data); and aggregation functions (e.g., to aggregate data from multiple devices 204, 206 into single packets for onward transmission to the applications and/or services 202).

According to embodiments of the disclosure these tasks may also be replicated in the virtual edge gateway node 214. For example, a task which is ongoing in the edge gateway node 208 when it enters a period of maintenance may be migrated to the virtual edge gateway node 214 (e.g., continued from its part-processed state) or restarted in the virtual edge gateway node 214.

Further details regarding the establishment of the virtual edge gateway node are discussed below with respect to FIGS. 3 and 4.

Figure 3:
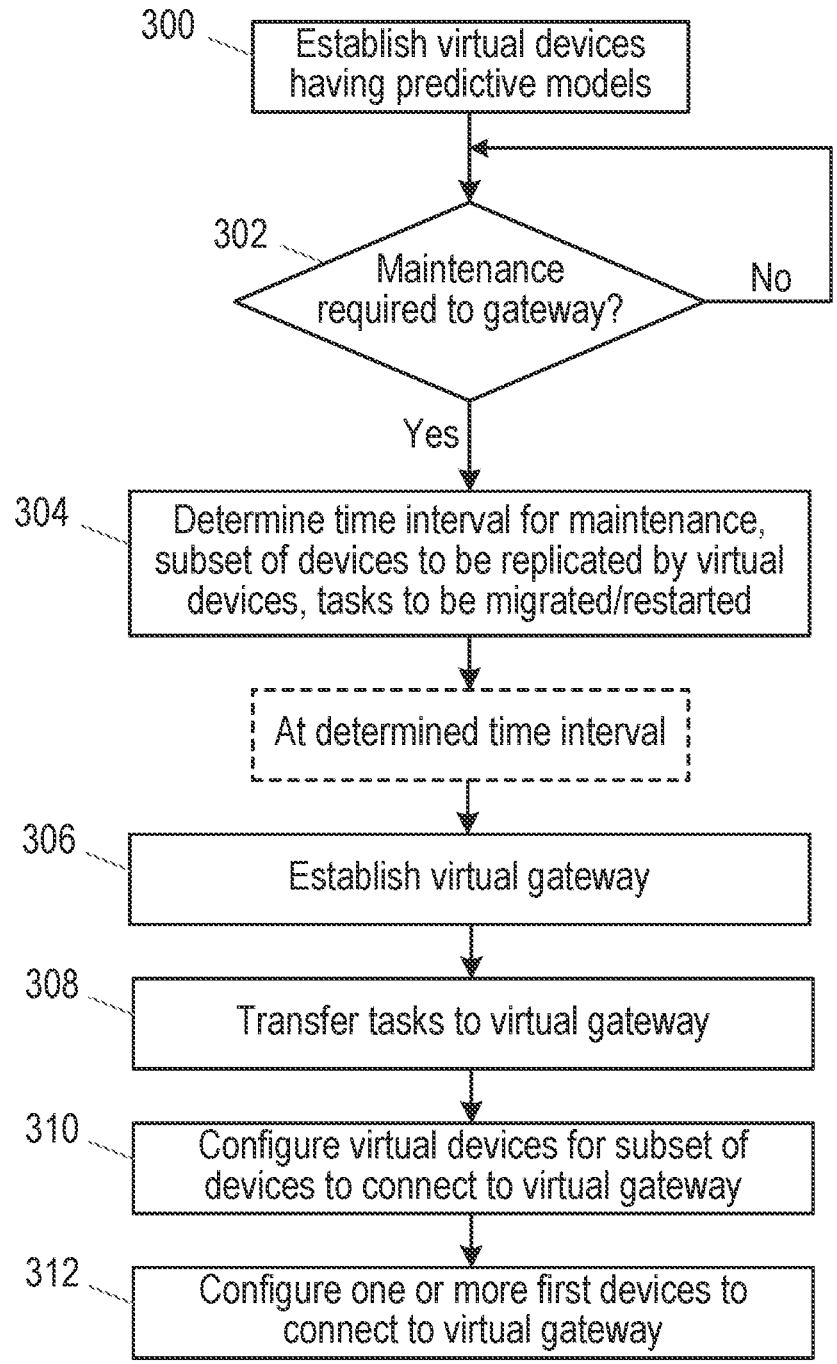
FIG. 3 is a flowchart of a method in a network node according to embodiments of the disclosure.

FIG. 3 is a flowchart of a method performed by a network node according to embodiments of the disclosure. The network node may be implemented in a network operations centre (such as the NOC 210 described above), or in any other network node a communications network.

The method is discussed in the context of the network 200 described above. Thus, the network comprises an edge gateway node 208 which provides connectivity between a plurality of devices and one or more services or applications of the communication network. The plurality of devices comprise one or more first devices 204 which are capable of connecting to a cloud environment 212 of the communication network in the absence of the edge gateway node 208, and one or more second devices 206 which are incapable of connecting to the cloud environment 212 in the absence of the edge gateway node 208.

The method begins in step 300, in which virtual devices 216 are established for at least each of the one or more second devices 206. In one embodiment, virtual devices 216 are additionally established for the first devices 204.

The virtual devices 216 may be implemented in the cloud environment 214. The virtual devices 216 are capable of replicating the data which is likely to be produced by the second devices 206 during a gateway upgrade. For example, the virtual devices 216 may comprise a predictive model which is trained to replicate data output by the respective device 204, 206. Such a predictive model may be trained based on real data output by the respective device 204, 206 using a machine-learning algorithm. Thus each virtual device 216 may be trained based on the real data output by a respective device 204, 206.

The virtual device 216 may be configured to obtain or be provided with such data during normal operation. The predictive model for each virtual device 216 may be trained using a machine-learning algorithm such as autoregressive integrated moving average (ARIMA), decision trees or neural networks, for example. The predictive model predicts one or more future data values based on a time series of data points.

Those skilled in the art will appreciate that the establishment of virtual devices, and particularly the training of the predictive models, may require a significant amount of computing resources. Thus step 300 may be performed at an earlier time than the rest of the method set out in FIG. 3.

In step 302, the network node determines whether maintenance is required to the edge gateway node 208. The trigger for maintenance may be periodic or based on the detection of an event. In the latter case, the event may comprise an instruction from an operator or an automated system (e.g., upon detection of a fault in the edge gateway node 208). The trigger may contain an indication of a particular time interval in which the maintenance is to be carried out (and in which the edge gateway node 208 will be unavailable). If the trigger does not contain such an indication, the maintenance may nonetheless be associated with a deadline by which the maintenance is to be carried out. The deadline may be a default value (e.g., a default period of time after the trigger) or set out in an SLA between an operator of the network 200 and a provider of the services and/or applications 202.

If no maintenance to the edge gateway node 208 is required, step 302 repeats until maintenance is triggered. If maintenance is required, the method proceeds to step 304 in which the network node determines a subset of the plurality of devices 204, 206 which are to be replicated by virtual devices 216, and which tasks are to be transferred to the virtual edge gateway node 214 (e.g., migrated or restarted) during maintenance of the edge gateway node 208. If no particular time interval for the maintenance was specified in the trigger in step 302, step 304 may additionally comprise determining a time interval for the maintenance.

Figure 4:
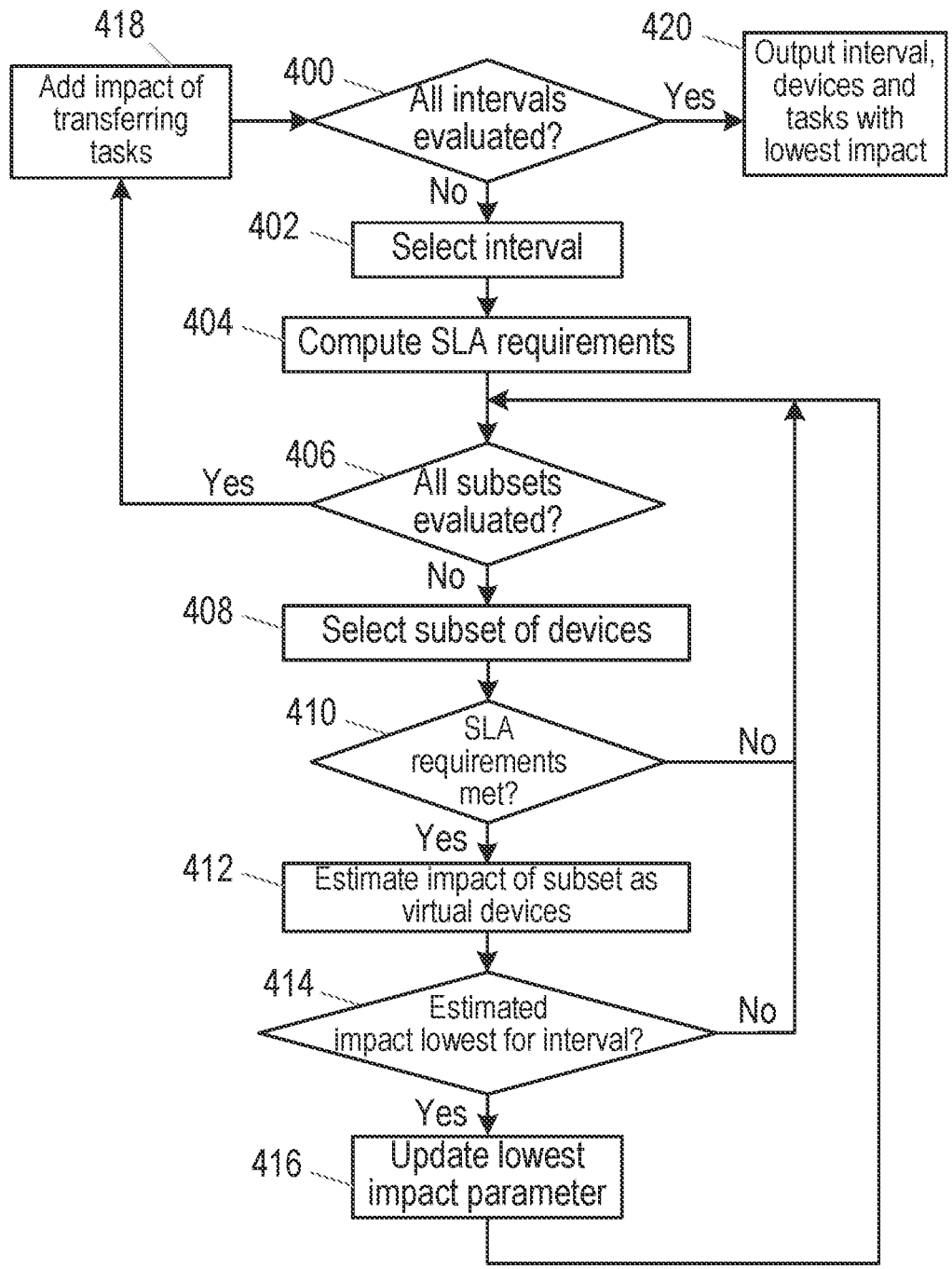
FIG. 4 is a flowchart of a further method in a network node according to embodiments of the disclosure.

One method for performing step 304 is set out in more detail in FIG. 4, which is a flowchart of a further method performed by the network node according to embodiments of the disclosure.

The method of FIG. 4 assumes that the time interval in which the maintenance is to be performed has not been specified in a trigger received in step 302 described above, and that the time interval should therefore be determined. Those skilled in the art will appreciate that the method may be straightforwardly amended to omit steps which iterate through multiple time intervals in case the time interval is specified in step 302.

The network node has knowledge of an expected duration of the maintenance, the specification of one or more SLAs covering the services provided by the edge gateway node 208 (note that the edge gateway node 208 may provide services for applications/services 202 operated by multiple providers and thus may be subject to multiple SLAs), the attributes of first and second devices 204, 206 (particularly which devices are capable of accessing the cloud environment 212 in the absence of the edge gateway node 208 and which are not), and the available cloud resources in the cloud environment 212. This information may be obtained, for example, through communication with relevant nodes of the network 200 (e.g., subscriber nodes, management nodes, etc) or by manual input by an operator.

The method further assumes that the amount of time in which the maintenance may be performed is split into multiple candidate time intervals. For example, the multiple candidate time intervals may comprise multiple or all possible time intervals between a current time and a deadline by which the maintenance is to be completed. The candidate time intervals may or may not overlap with each other. The candidate time intervals may have a duration equal to at least the expected duration of the maintenance of the edge gateway node 208.

The method begins in step 400, in which the network node determines whether all candidate time intervals have been evaluated. In a first iteration, of course, this determination is answered negatively and the method proceeds to step 402 in which a first interval of the multiple candidate time intervals is selected.

In step 404, the SLA requirements for the selected time interval are computed. Note that an SLA specification may vary over time. For example, a provider of the applications/services 202 may require data at a relatively high rate or quality during day-time hours, and at a relatively low rate or quality during night-time hours.

The plurality of devices (e.g., the first devices 204 and the second devices 206) are arranged into a plurality of candidate subsets of devices. Each subset may comprise all of the second devices 206, and potentially one or more of the first devices 204. At least one of the subsets may comprise all of the first and second devices 204, 206.

In step 406, the network node determines whether all candidate subsets of devices have been evaluated. In a first iteration, of course, this determination is answered negatively and the method proceeds to step 408 in which a first subset of the multiple subsets of devices is selected.

In step 410, the network node determines whether replacing the selected subset of devices with virtual devices 216 (and not replacing those devices which are not in the subset) meets the SLA requirements determined in step 404. If the SLA requirements are not met by the currently selected subset of devices, the method reverts to step 406.

If not all candidate subsets have been evaluated at this point, a different subset of devices is then selected in step 408.

If the SLA requirements are met, the network node estimates an impact metric of replacing the selected subset of devices with virtual devices 216 (and not replacing those devices which are not in the subset). The impact metric comprises a metric which indicates the negative impact of replacing the selected subset of devices with virtual devices 216 on the services provided by the network 200 (e.g., to the providers of the applications and/or services 202. For example, the impact metric may comprise one or more of: a quality of sensor data provided to the applications and/or services; energy consumption by the network 200; a bandwidth utilized by the network 200; an amount of cloud resources required; and a volume of data transferred. In each case, the impact metric may comprise or relate to a change in each of these parameters as a result of replacing the selected subset of devices with virtual devices 216.

For example, the quality of data may relate to the accuracy and/or the reliability of the data. That is, taking the real device data (e.g., sensor measurements) as a reference, the error between the data stream output by the virtual devices 216 and the reference stream may be computed. This gives an indication of the error (and hence the impact) of using virtual devices 216 while the edge gateway node 208 is undergoing maintenance.

The quality of data may additionally take into account knowledge that a device generates more or less data during a particular time period. This may be automatically predicted using the predictive models, or determined based on the SLA requirements, for example. Thus the negative impact of replacing a particular device may be less at a time when the device generates less data, and vice versa.

The energy consumption, required bandwidth, required cloud resources and the volume of data transfer are directly related to the particular subset of devices which are selected, and hence which virtual devices 216 are selected and their location in the cloud environment 212.

In step 414, the network node determines whether the estimated impact metric is the lowest for the currently evaluated time interval, i.e., the estimated impact of the currently selected subset of devices is the lowest (i.e., least negative impact) of those subsets which have so far been evaluated for the current time interval. If not, the method proceeds directly to step 406, in which the network node again determines whether all subsets have been evaluated, and a further subset of devices may be selected. If the estimated impact metric is the lowest, the method proceeds to step 406 via step 416, in which the network node updates a stored lowest impact parameter for the evaluated time interval.

In this way, the method iterates through steps 406 to 416 for each of the plurality of candidate subsets of devices for a particular time interval, estimating the impact metric for each subset of devices which meets the SLA requirements and storing the lowest impact metric value for that time interval (as well as the associated subset of devices).

Once it is determined that all of the subsets have been evaluated in step 406, the method proceeds to step 418, in which the network node adds the impact of transferring tasks from the edge gateway node 208 to the virtual edge gateway node 214.

Step 418 may additionally comprise substeps of determining which tasks should be migrated to the virtual edge gateway node 214 and which tasks should be restarted in the virtual edge gateway node 214. The substeps may comprise finding, for each task in the edge gateway node 208, the impact of migration versus the impact of restart. Migration of a task is generally preferable, to avoid wasting computing resources in the edge gateway node 208 and the virtual edge gateway node 214; however, migration of certain tasks may entail usage of greater network resources than restarting those tasks. Thus certain tasks may be preferably restarted than migrated.

The impact of transferring the tasks is thus estimated and added to the lowest impact value for the currently evaluated time interval.

In some embodiments, the impact of transferring tasks from the edge gateway node 208 to the virtual edge gateway node 214 may depend on the particular subset of devices 204, 206 which are to be replaced by virtual devices 216. In this case, the calculation of the impact of transferring tasks (and potentially the determination of which tasks to migrate or restart) may be performed in step 412, with the estimation of the impact of replacing the selected subset of devices with virtual devices. In this case, step 418 may be omitted.

The method returns to step 400. If any candidate time intervals remain to be evaluated, a further candidate time interval is selected in step 402 and the process of finding the lowest impact value is repeated for that further candidate time interval.

Thus the method iterates until all candidate time intervals have been evaluated. At that point, the method proceeds from step 400 to step 420, and the network node outputs the candidate time interval associated with the lowest impact value, as well as the subset of devices (to be replicated by virtual devices) providing that lowest impact value, and the configuration of tasks to be transferred from the edge gateway device 208 to the virtual edge gateway device 214 (e.g., which tasks are to be migrated, and which tasks are to be restarted).

The description now returns to FIG. 3, and at the time interval for maintenance of the edge gateway node 208 (as specified in step 302 or as determined in step 304) the method proceeds to step 306 in which a virtual edge gateway node 214 is established in the cloud environment 212.

As noted above, the virtual edge gateway node 214 is configured to replicate some or all of the functionality of the edge gateway node 208 undergoing maintenance. Thus in step 308 tasks performed by the edge gateway node 208 are transferred to the virtual edge gateway node 214. One or more of these tasks may be migrated to the virtual edge gateway node 214 (i.e., an ongoing task is transferred to the virtual edge gateway node 214 in a semi-processed state). Alternatively or additionally, one or more of these tasks may be restarted in the virtual edge gateway node 214 (i.e., an ongoing task is cancelled in the edge gateway node 208 and restarted in the virtual edge gateway node 214). Which tasks are to be migrated and which are to be restarted may be determined based on the computations performed in step 304.

In step 310, the network node identifies virtual devices 216 for the subset of devices determined in step 304, and configures those virtual devices 216 to connect to the virtual edge gateway node 214. Thus the virtual devices 216 may be provided with addressing information to reach the virtual edge gateway node 214 (e.g., an IP address or any other suitable addressing protocol), and configured to provide their synthesized data to the virtual edge gateway node 214.

It will be recalled that the subset of devices for which virtual devices are provided comprises the second devices 206, any may additionally comprise one or more of the first devices 204. In step 312, the network node configures one or more first devices 204 to connect to the virtual edge gateway node 214 instead of the edge gateway node 208. Thus the one or more first devices 204 may be provided with addressing information to reach the virtual edge gateway node 214 (e.g., an IP address or any other suitable addressing protocol), and configured to provide their real data to the virtual edge gateway node 214.

Now that the virtual edge gateway node 214 is receiving data from the devices 204, 216, the one or more applications and/or services 202 may be switched to receive their data from the virtual edge gateway node 214 instead of the edge gateway node 208. At this point the applications/services interact with the devices or their virtual twins through the virtual edge gateway node 214.

The connections of the edge gateway node 208 may now be torn down since the northward connections (i.e. to the application(s) 202) and the southward connections (i.e. from the devices 204, 206) have already been switched to the virtual edge gateway node 214. The maintenance of the edge gateway node 208 may now be performed.

Once maintenance is complete, the edge gateway node 208 can be restarted and the reverse process performed to transfer functionality back to the edge gateway node 208 from the virtual edge gateway node 214. Thus tasks in the virtual edge gateway node 214 are transferred back to the edge gateway node 208 (e.g., migrated or restarted) in a corresponding manner to that described in step 308 above. The first and second devices 204, 206 are connected to the edge gateway node 208. These connections may be duplicates of any connections to the virtual edge gateway node 214, to ensure continuous operation at the point of switchover back to the edge gateway node 208. The applications and/or services 202 are switched back to the edge gateway node 208 instead of the virtual edge gateway node 214, and the maintenance process is complete. The connections of the virtual edge gateway node 214 may be torn down, and the cloud resources used for its establishment released.

Figure 5:
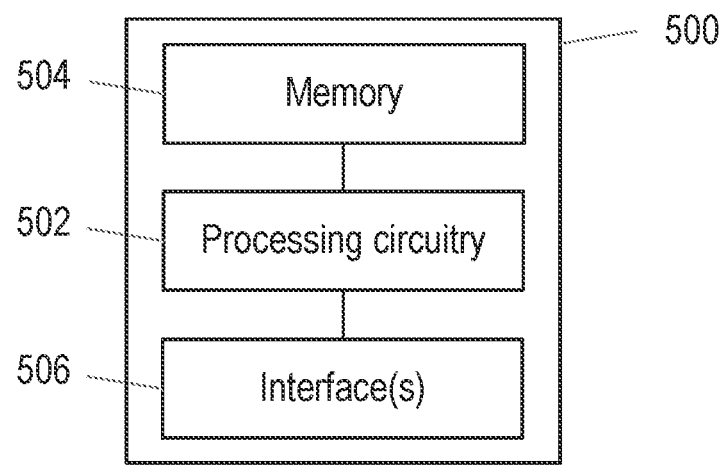
FIGS. 5 and 6 are schematic diagrams of network nodes according to embodiments of the disclosure.

FIG. 5 is a schematic diagram of a network node 500 according to embodiments of the disclosure. The network node 500 may be configured to implement or perform one or more of the methods described above with respect to FIGS. 3 and 4. The network node 500 may be implemented in a network operator centre (NOC), for example, such as the NOCs 110, 210 described above with respect to FIGS. 1 and 2.

The network node 500 is configured to mitigate disruption during maintenance of an edge gateway node (such as the edge gateway nodes 108, 208 described above with respect to FIGS. 1 and 2) of a communication network. The edge gateway node connects a plurality of devices to one or more services of the communication network. The plurality of devices comprise one or more first devices (e.g., devices 104) which are capable of connecting to a cloud environment of the communication network in the absence of the edge gateway node, and one or more second devices (e.g., devices 106) which are incapable of connecting to the cloud environment in the absence of the edge gateway node. The network node 500 comprises processing circuitry 502, a non-transitory device-readable medium (such as memory) 504 and one or more interfaces 506. According to embodiments of the disclosure, the processing circuitry 502 is configured to: establish respective virtual devices for the one or more second devices, the virtual devices comprising predictive models trained to replicate data output by the respective one or more second devices; and, during a time interval in which the maintenance of the edge gateway node is performed: configure the one or more virtual devices to connect to a virtual edge gateway node established in the cloud environment; and configure at least one of the one or more first devices to connect to the virtual edge gateway node.

The processing circuitry 502 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other components, such as device readable medium 504, the network node 500 with functionality. For example, processing circuitry 502 may execute instructions stored in device readable medium 504 or in memory within processing circuitry 502. In some embodiments, processing circuitry 502 may include a system on a chip (SOC). In some embodiments, processing circuitry 502 may include radio frequency (RF) transceiver circuitry and baseband processing circuitry.

In certain embodiments, some or all of the functionality described herein as being provided by a network node may be performed by processing circuitry 502 executing instructions stored on device readable medium 504 or memory within processing circuitry 502. In alternative embodiments, some or all of the functionality may be provided by processing circuitry 502 without executing instructions stored on a separate or discrete device readable medium, such as in a hard-wired manner. In any of those embodiments, whether executing instructions stored on a device readable storage medium or not, processing circuitry 502 can be configured to perform the described functionality. The benefits provided by such functionality are not limited to processing circuitry 502 alone or to other components of the network node 500, but are enjoyed by the network node 500 as a whole, and/or by end users and the network generally.

Device readable medium 504 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 502. Device readable medium 504 may store any suitable instructions, data or information, including a computer program, software, an application including one or more of logic, rules, code, tables, etc. and/or other instructions capable of being executed by processing circuitry 502 and utilized by the network node 500. Device readable medium 504 may be used to store any calculations made by processing circuitry 502 and/or any data received via interface 506.

In some embodiments, processing circuitry 502 and device readable medium 504 may be considered to be integrated.

Interface(s) 506 may be used in the communication of signalling and/or data between the network node 500 and one or more further network nodes or functions. The interface(s) 506 may comprise any suitable hardware and/or software for the transmission of data using any medium, such as wireless, wired, or optical mediums.

Figure 6:
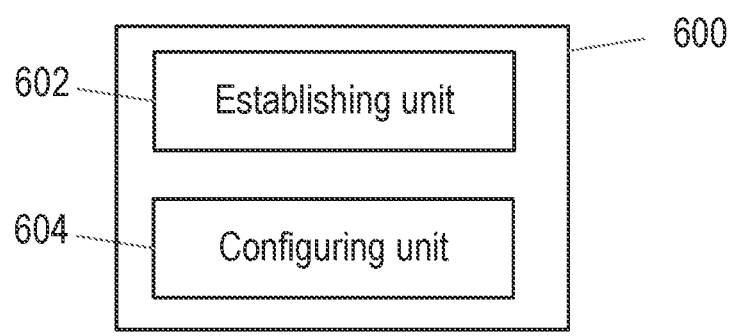

FIG. 6 is a schematic diagram of a network node 600 according to embodiments of the disclosure. The network node 600 may be configured to implement or perform one or more of the methods described above with respect to FIGS. 3 and 4. The network node 600 may be implemented in a network operator centre (NOC), for example, such as the NOCs 110, 210 described above with respect to FIGS. 1 and 2.

The network node 600 is configured to mitigate disruption during maintenance of an edge gateway node (such as the edge gateway nodes 108, 208 described above with respect to FIGS. 1 and 2) of a communication network. The edge gateway node connects a plurality of devices to one or more services of the communication network. The plurality of devices comprise one or more first devices (e.g., devices 104) which are capable of connecting to a cloud environment of the communication network in the absence of the edge gateway node, and one or more second devices (e.g., devices 106) which are incapable of connecting to the cloud environment in the absence of the edge gateway node. The network node 600 comprises an establishing unit 602 and a configuring unit 604. The establishing unit 602 is configured to establish respective virtual devices for the one or more second devices. The virtual devices comprise predictive models trained to replicate data output by the respective one or more second devices. The configuring unit 604 is configured to, during a time interval in which the maintenance of the edge gateway node is performed: configure the one or more virtual devices to connect to a virtual edge gateway node established in the cloud environment; and configure at least one of the one or more first devices to connect to the virtual edge gateway node.

The term "unit" may have its conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, such as those that are described herein.

It should be noted that the above-mentioned embodiments illustrate rather than limit the concepts disclosed herein, and that those skilled in the art will be able to design many alternative embodiments without departing from the scope of the appended following claims. The word "comprising" does not exclude the presence of elements or steps other than those listed in a statement, "a" or "an" does not exclude a plurality, and a single processor or other unit may fulfil the functions of several units recited in the statements. Any reference signs in the claims shall not be construed so as to limit their scope.

The invention claimed is:

1. A network node for mitigating disruption during maintenance of an edge gateway node of a communication network, the edge gateway node connecting a plurality of devices to one or more services of the communication network, the plurality of devices comprising one or more first devices which are capable of connecting to a cloud environment of the communication network in an absence of the edge gateway node, and one or more second devices which are incapable of connecting to the cloud environment in the absence of the edge gateway node, the network node comprising processing circuitry and a non-transitory machine-readable medium storing instructions which, when executed by the processing circuitry, cause the network node to:
    establish respective virtual devices for the one or more second devices, the respective virtual devices comprising predictive models trained to replicate data output by the one or more second devices; and
    during a time interval in which the maintenance of the edge gateway node is performed:
        configure the respective virtual devices to connect to a virtual edge gateway node established in the cloud environment and provide replicated data to the virtual edge gateway node during the time interval, wherein the virtual edge gateway node replicates functionality of the edge gateway node during the time interval in which the maintenance of the edge gateway node is performed; and
        configure at least one of the one or more first devices to connect to the virtual edge gateway node.

2. The network node according to claim 1, wherein the network node is further caused to:
    a) determine service level agreement requirements associated with connectivity for the plurality of devices;
    b) identify one or more subsets of the plurality of devices for which virtual devices can be provided while meeting the service level agreement requirements;
    c) evaluate an impact metric associated with providing virtual devices for each of the one or more subsets; and
    d) select a subset of devices with a lowest impact metric.

3. The network node according to claim 2, wherein the network node is further caused to:
    establish a respective virtual device for each device of the subset of devices with the lowest impact metric to establish respective virtual devices, the respective virtual devices comprising predictive models trained to replicate data output by the devices of the subset of devices; and during a time interval in which the maintenance of the edge gateway node is performed:

configure the respective virtual devices for the subset of devices to connect to the virtual edge gateway node established in the cloud environment and provide the replicated data.

4. The network node according to claim 3, wherein the subset of devices comprises the one or more second devices.

5. The network node according to claim 3, wherein the subset of devices comprises at least one first device.

6. The network node according to claim 2, wherein the impact metric comprises one or more of: a quality of sensor data; energy consumption; a utilized bandwidth; and a volume of data.

7. The network node according to claim 2, wherein the network node is further caused to:

repeat steps a) to d) for each of a plurality of time intervals;

for each of the plurality of time intervals, add to the lowest impact metric an impact associated with transferring tasks from the edge gateway node to the virtual edge gateway node, to determine a lowest overall impact; and select the time interval associated with the lowest overall impact as the time interval in which the maintenance of the edge gateway node is performed.

8. The network node according to claim 1, wherein the network node is further caused to, during the time interval in which the maintenance of the edge gateway node is performed:

transfer tasks performed by the edge gateway node to the virtual edge gateway node.

9. The network node according to claim 8, wherein transferring tasks to the virtual edge gateway node comprises one or more of: restarting a task in the virtual edge gateway node; and migrating an ongoing task to the virtual edge gateway node.

10. The network node according to claim 1, wherein each predictive model of the predictive models is trained to replicate data output by its respective device using a machine-learning algorithm.

11. The network node according to claim 1, wherein the one or more second devices are configured to implement one or more radio access technologies for accessing the cloud environment in the absence of the edge gateway node.

12. The network node according to claim 1, wherein the network node is implemented in a network operations centre, NOC, of the communication network.

13. A method in a network node for mitigating disruption during maintenance of an edge gateway node of a communication network, the edge gateway node connecting a plurality of devices to one or more services of the communication network, the plurality of devices comprising one or more first devices which are capable of connecting to a cloud environment of the communication network in an absence of the edge gateway node, and one or more second devices which are incapable of connecting to the cloud environment in the absence of the edge gateway node, the method comprising:

establishing respective virtual devices for the one or more second devices, the respective virtual devices comprising predictive models trained to replicate data output by the one or more second devices; and during a time interval in which the maintenance of the edge gateway node is performed:

configuring the respective virtual devices to connect to a virtual edge gateway node established in the cloud environment and provide replicated data, wherein the virtual edge gateway node replicates functionality of the edge gateway node during the time interval in which the maintenance of the edge gateway node is performed; and configuring at least one of the one or more first devices to connect to the virtual edge gateway node.

14. The method according to claim 13, further comprising:

a) determining service level agreement requirements associated with connectivity for the plurality of devices;

b) identifying one or more subsets of the plurality of devices for which virtual devices can be provided while meeting the service level agreement requirements;

c) evaluating an impact metric associated with providing virtual devices for each of the one or more subsets; and d) selecting a subset of devices with a lowest impact metric.

15. The method according to claim 14, further comprising:

establishing a respective virtual device for each device of the subset of devices with the lowest impact metric to establish respective virtual devices, the respective virtual devices comprising predictive models trained to replicate data output by the respective devices of the subset; and during a time interval in which the maintenance of the edge gateway node is performed:

configuring the respective virtual devices for the subset of devices to connect to the virtual edge gateway node established in the cloud environment and provide the replicated data.

16. The method according to claim 15, wherein the subset of devices comprises the one or more second devices.

17. The method according to claim 15, wherein the subset of devices comprises at least one first device.

18. The method according to claim 14, wherein the impact metric comprises one or more of: a quality of sensor data; energy consumption; a utilized bandwidth; and a volume of data.

19. The method according to claim 14, further comprising:

repeating steps a) to d) for each of a plurality of time intervals;

for each of the plurality of time intervals, adding to the lowest impact metric an impact associated with transferring tasks from the edge gateway node to the virtual edge gateway node, to determine a lowest overall impact; and selecting the time interval associated with the lowest overall impact as the time interval in which the maintenance of the edge gateway node is performed.

20. The method according to claim 13, wherein each predictive model of the predictive models is trained to replicate data output by its respective device using a machine-learning algorithm.

* * * * *